July 19, 1960 E. H. ATKIN 2,945,653
AIRCRAFT SKIN CONSTRUCTION
Filed Dec. 28, 1956
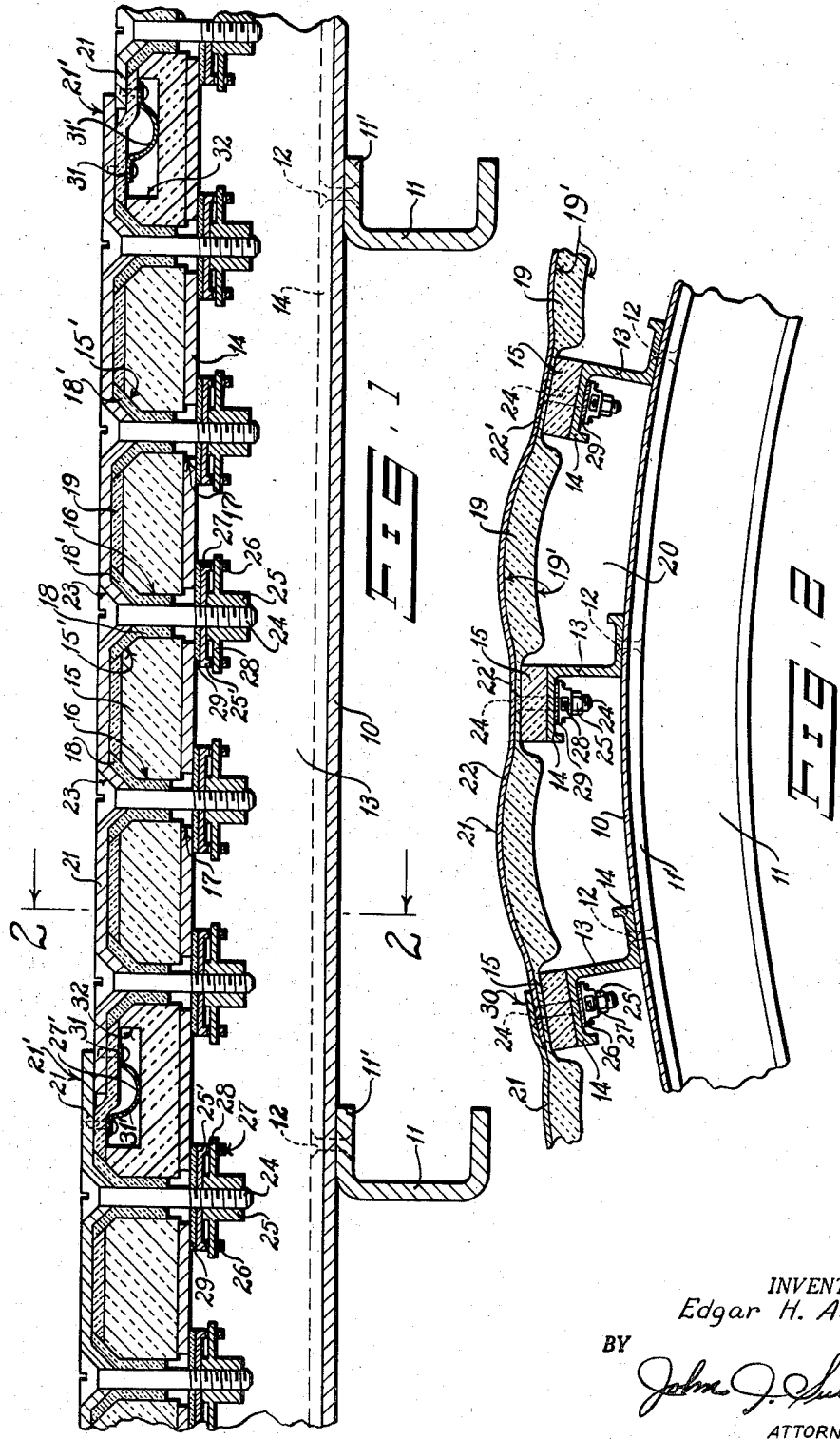
INVENTOR.
Edgar H. Atkin
BY
ATTORNEY.

United States Patent Office 2,945,653
Patented July 19, 1960

2,945,653

AIRCRAFT SKIN CONSTRUCTION

Edgar H. Atkin, Baldwin, N.Y., assignor to Republic Aviation Corporation, near Farmingdale, N.Y., a corporation of Delaware Filed Dec. 28, 1956, Ser. No. 631,140

16 Claims. (Cl. 244—119)

This invention relates to a heat-resistant construction for structural members or bodies and is particularly adapted for the construction of aircraft components such as fuselages, wings, rudders, fins, stabilizers and the like.

The present invention provides a protective supplemental outer skin for the structural components of an aircraft such as fuselage, empennage, airfoils and the like to absorb, or isolate from the main structural components the heat developed or generated by friction of the airstream, and to transfer all aerodynamic forces, loads and pressures to the underlying main structure of the member or component. Thus, the associated aircraft component is largely insulated from heat generated by skin friction and yet receives and sustains all aerodynamic loads and forces.

More specifically, the instant invention contemplates an outer or supplemental skin mounted on and attached to an aircraft component to enclose and house said component. This secondary or supplemental skin is so constructed that it entirely covers and insulates the aircraft component against disintegration, distortion, warpage, etc., due to heat developed by skin friction especially when combined with other external factors, such as the aerodynamic loads and pressures to which the component is normally subjected and which the supplemental or outer skin resists incidental to the transfer thereof to the underlying structure. At the same time this supplemental skin is constructed with elastic or resilient characteristics that permit it to expand and contract within limits in reacting to heat to the end that aerodynamic loads and pressures imposed thereon have substantially no permanent effect.

In addition, the general or overall loads and resultant stresses are distributed over the entire area of the supplemental skin and are transmitted into the frame or structure of the underlying aircraft component.

With the above and other objects in view, as will be apparent, this invention consists in the construction, combination and arrangement of parts all as hereinafter more fully described, claimed and illustrated in the accompanying drawings, wherein:

Fig. 1 is a section through the skin of an aircraft to show the construction of the present protective supplemental or secondary skin and the manner in which it is associated with the outer surface of an underlying or enclosed aircraft component; and Fig. 2 is a section taken along line 2—2 of Fig. 1.

As the speed of the aircraft increases the heat resulting from skin friction becomes increasingly greater. The heat generated by skin friction is presently reaching a degree where it, together with the aerodynamic loads and pressures imposed on the external surfaces of the aircraft are injurious to, and destructive of, the conventional skin of the aircraft as well as of the entire structural rigidity of the internal supporting structure. One this structural rigidity has been impaired the original characteristics of the metal which goes to make up the internal supporting structure and skin can never be satisfactorily restored.

In addition to the thermal stresses imposed on the external surfaces or skin of the aircraft at high speed there are other stresses to which the skin is subjected due to aerodynamic loads acting thereon. These consist of local as well as general loads and stresses, i.e., the cumulative local loads which are distributed over the entire surface or surfaces of the aircraft and into its internal supporting structure or frame. Heretofore, it has been primarily these aerodynamic loads and stresses that have had to be anticipated and to withstand such loads construction techniques and designs had to be developed. However, with the increase of thermal loads and forces and the affect thereof on the characteristics of the skin material, these aerodynamic loads, forces and pressures become proportionally greater to the extent that the prior or conventional constructions are no longer adequate in maintaining structural or material integrity.

Attempts have been made to overcome these problems resulting from increased speed by employing heat-resisting metals or alloys having heat-resisting characteristics.

These attempts have proven objectionable and unsatisfactory, however, because of the entirely different characteristics of such high temperature metals, including strength and rigidity as compared with the prior metals used. Titanium which is also a higher temperature resistant metal than aluminum, has additional problems involved in its manufacture and working and fabrication in general.

The present invention, among other things proposes to overcome or solve the foregoing problems by a construction which associates a secondary or outer skin with and around the conventional aircraft component resulting in an overall combination of high, medium and low heat-resisting materials. This secondary or supplemental skin is so constructed and assembled that the heat-resistant and strength characteristics of each material are preserved and employed to the fullest when forming the external surfaces of high speed aircraft. Thus, the high heat-resistant material alone is subjected to and dissipates the thermal stresses imposed on the component or components of the aircraft and is also initially subjected to the aerodynamic loads which are ultimately transferred to the underlying structure. The medium and low heat-resistant materials receive and withstand the remaining loads and stresses, i.e., the general stresses resulting from the aerodynamic loads imposed on the aircraft component.

Referring more particularly to the drawings, 10 designates the conventional skin of any aircraft component, such as the fuselage, wing, nacelle, etc. For this purpose the usual aluminum, aluminum alloy material or the equivalent may be employed. The skin 10 covers or encloses the frame 11 of the component which may be a plurality of spaced bulkheads, rings, ribs, stringers or the like. The frame 11 determines the ultimate contour or shape of the component following conventional practice in aircraft construction. To this end each of the elements of the frame 11 has a peripheral flange 11' at its outer edge so disposed that the skin 10 rests flush thereon. Suitable attaching means, such as the rivets 12, are employed to secure the skin 10 to the flanges 11' of the frame 11.

Hence, the skin 10 is fixedly secured to and completely covers and encloses the component in the usual way to thereby form a relatively immovable and, in effect an integral part of the component assembly. The component thus formed has all the structural strength and rigidity of the conventional construction. In short, the aircraft component may be fabricated in strict conformance with conventional practice, or may be structurally modified as desired in accordance with good design, it being understood that the construction per se of the component is not pertinent to this invention.

According to the instant invention external stringers or ribs 13 are secured to the outer surface of the skin 10 through the rivets 12. While the external stringers 13 may be substituted for similar internal stringers generally used to connect the elements of the frame 11 they can be employed in addition to such internal stringers. Manifestly the elimination of the internal stringers simplifies construction and assembly particularly at the intersections of such internal stringers with the elements of the frame 11 and reduces weight but such elimination is not essential to or a part of this invention.

The stringers 13 in the preferred construction are spaced at regular distances and are coextensive one with the other. Along its opposed edges each stringer 13 is formed with flanges 14 extending in opposite directions from the stringer to produce a generally Z section for the stringer. The flanges 14 of each stringer 13 are so curved or bowed that the outer face of one of the flanges 14 conforms to and lies flush against the outer surface of the skin 10 and the outer face of the other flange 14 is disposed in spaced relationship and approximately parallel to the skin 10.

The primary structure of the component with or without internal stringers is designed and adapted to withstand all loads or stresses imposed on the component. The materials employed in the fabrication of the component usually are medium and/or low heat-resisting, such as titanium, aluminum or aluminum alloys.

Mounted on and enclosing or housing the basic aircraft component is a secondary skin which insulates and protects the component by receiving and dissipating all thermal stresses to which the component may be subjected as well as withstands all aerodynamic loads imposed thereon. At the same time, this secondary skin and its associated elements is so constructed and mounted on the underlying structure or component that it will transfer virtually all aerodynamic loads and pressures acting thereon ultimately to the structure of the contained aircraft component.

To this end a block or strip 15 of compressed or relatively dense fiberous heat-insulating material, such as a combination of asbestos fibre and an inorganic binder is disposed on the outer face of each flange 14 of the stringers 13 remote from the skin 10 of the aircraft component. Each of the strips 15 is coextensive with the associated stringer 13 and is provided with a series of spaced transverse holes 16 which overlie and register with corresponding slots 17 which pierce the outer flange 14 of each stringer 13. Preferably each hole 16 is normally located between the ends of its coacting slot 17 so that the slot extends on each side of the hole.

The outer face of each strip 15 at each of the holes 16 is countersunk or dimpled at 15' and a bushing 18 having a countersunk or flared head 18' is press-fitted into each hole 16 so that its head 18' seats flush in the dimple 15'. The length of each of the bushings 18 is preferably less than the thickness of the strip 15, so that the inner end of the bushing terminates just inwardly of the inner surface of the strip 15 when the head of the bushing 18 is fully seated in its coacting dimple 15' in the face of the strip 15. These bushings 18 are each formed of compressed asbestos or an equivalent heat-resistant and insulation material.

A blanket or lagging 19 is disposed over the several strips 15 to thereby completely enclose and cover the underlying component. This lagging has a thickness approximately equal to that of the strips 15 and consists preferably of shavings, fibers or other particles of loosely packed, heat-resisting material, such as asbestos, fibre glass or refractory wool, enclosed between a pair of supporting and housing sheets or nets of suitable stiffening material, such as for example relatively thin or fine mesh of stainless steel or material having similar characteristics. When the lagging 19 is thus fabricated and disposed on the strips 15 a plurality of dead-air spaces 20 are established by the inner surface of the lagging 19 between the stringers 13 and the outer surface of the skin 10.

An outer or supplemental skin is adapted to encircle and bear on the lagging or blanket 19. This skin comprises a plurality of sheets 21 of high thermal-resistant material, such as stainless steel or other metals having similar characteristics, disposed one adjacent the other with their adjoining ends or edges in overlapping relationship to thereby completely enclose or encircle the basic aircraft component. Each of these sheets 21 is provided with corrugations 22 longitudinally of the component and so arranged that one of the depressions 22' between such corrugations overlies and aligns coextensively with the outer face of each of the strips 15. Each such depression 22' is shaped or contoured to conform to the surface of the associated strip 15 to the end that the surfaces of the depression and the strip are disposed in flush contact one with the other. A plurality of holes 23 centrally pierce the depressions 22' of each section 21 corresponding to and in registration with the holes 16 and slots 17 in the respective strips 15 and flanges 14 of the stringers 13 to aid and facilitate the proper mounting of the sections 21 thereon.

When each sheet (or a group of pre-assembled sheets) 21 is so positioned on and over the strips 15 with the holes 16 and 23 and the slots 17 in registration, it is secured in place by the screw bolts 24. The lagging 19 contained or sandwiched between the strips 15 and the sheets 21 and overlying the holes 16 in the strips 15 may be perforated to permit the passage of the bolts 24. The outer face of each sheet 21 defining each of the holes 23 is dimpled to thereby seat itself in the countersunk or flared heads 18' of the associated bushings 18.

A standard or conventional anchor or plate nut 25 is fixedly secured to the under surface of each flange 14 of the stringers 13 in alignment with each slot 17 and the co-acting holes 16 and 23 and the passage in the bushing 18 so as to receive and permit a bolt 24 therein to engage the nut 25. These nuts 25 may be any standard floating type consisting of the anchoring or attaching plate 25' having a cage or laterally disposed sides 26 each of which is pierced centrally by a slot 27. Ears 28 project from opposed sides of the nut 25 and are received in the slots 27. Thus, a screw bolt 24 can be threaded into the nut 25 and when so situated is capable of some movement relative to the stringers 13. This construction insures proper alignment of the nuts 25 with their associated and complementary holes 16 and slots 17 for the reception of the bolts 24, as well as to permit limited movement of the bolts 24 with their respective skin sheets 21 relative to the flanges 14 of the stringers 13.

Upon the tightening of each bolt 24 in attaching the sheets 21 to the stringers 13 that part of the lagging 19 underlying the depressions 22' of the sheets 21 will be compressed against the strips 15. The remaining or intervening portions of the lagging 19 will be substantially unaffected and will be disposed between adjacent stringers 13 to define the outward limits of the space 20. At the same time the heads of the bolts 24 are drawn into and seat in the dimpled face of the sheets 21 to thereby form a flush continuation of the outer surface of the sheets.

The bolts 24, if not the bolt and nut assemblies 24—25, are made of high heat-resistant metal like that of the sheets 21. An insulating washer 29 of compressed asbestos or the equivalent may be employed between the plate 25' of each anchor nut 25 and the adjacent face of the flange 14 of the stringers 13 to reduce the transfer of heat therethrough.

Thus, the sheets 21 are secured to and overlie and enclose the stringers 13, the blanket or lagging 19 surrounding and enclosing the aircraft component and its skin 10. The edges 30 of the sheets 21 disposed substantially parallel to the corrugations 22, each terminate in one of the depressions 22' and the corrugations 22 and preferably overlap the edge portion of the next adjacent sheet 21 as shown in Fig. 2. The holes 23 in these overlapping edges of the sheets 21 thereby register one with the other and with the underlying bushings 18 and holes 16 to permit the passage of bolts 24 for the attachment of the sheets 21 where they overlap the stringer 13 and strip 15.

At the remaining ends, i.e., the ends disposed transversally of the corrugations 22, the sheets 21 overlap one another, as at 21', and need not be otherwise connected. If required or desired, however, these overlapping ends may be interconnected by and through a spring strip 31. Each of these strips 31 is secured along its longitudinal edges by means of screws or the like as shown in Fig. 1, to the under or inner faces of the overlapping edges of the associated sheets 21 one edge of the strip 31 being secured to one overlapping sheet while its opposite edge is secured to the other sheet. Medially of its width each strip 31 is bowed or curved inwardly, as at 31', to thereby form an expansion joint between the edges of adjacent sheets and permit relative movement between the sheets longitudinally of the corrugations 22.

Where the expansion joints 31 are employed, the portions of the asbestos strips 15 adjacent thereto are formed with recesses 32 therein to allow the attachment of the expansion joints to the sheets 21 and to accommodate the bow 31' thereof. The strips 31 are formed of high heat-resistant metal similar to that of the sheets 21.

Since the lagging 19 comprises a blanket of loosely packed material, as hereinabove described, it is inherently resilient to a limited degree. Relative movement of the sheets 21 under load is within this range of resiliency so that deformation of the lagging, if any, is negligible. Moreover, the recess 32 adjacent each overlap 21' of the sheets 21 permits a localized portion of the lagging 19 to bow or sag and compress or stretch to the relatively small extent that may be necessary.

What is claimed is:

1. A supplemental skin for an aircraft component including a skin and internal structure comprising a plurality of overlapping sheets of high heat-resistant material disposed in spaced relation to said component and enclosing and housing the component, expansion means connecting said sheets one to another and floating connections between said sheets and the component whereby the several sheets are capable of limited movement relative both to each other and to the component.

2. A supplemental skin for an aircraft component comprising a plurality of overlapping interconnected sheets of high heat-resistant material formed with parallel corrugations and spaced from and surrounding and enclosing said component, removable and replaceable means connecting the sheets to the component for limited movement relative thereto, and insulating means disposed adjoining the inner surfaces of said sheets in spaced relation to the component.

3. A protective supplemental skin for an aircraft component comprising a plurality of corrugated, overlapping sheets of high heat-resistant metal surrounding and enclosing said component in spaced relation thereto, connection means between the overlapping portions of said sheets and between said sheets and the component to permit limited, substantially universal movement of the sheets relative to each other and to the aircraft component, all of said connections being disposed in the depressions of the corrugations of the sheets, and heat-insulating material disposed adjoining the inner surface of the supplemental skin in spaced relation to the aircraft component.

4. A protective supplemental skin for an aircraft component including an internal structural frame and a surrounding skin comprising a plurality of sheets of high heat-resistant metal formed to surround and enclose the component, each of said sheets being formed with corrugations coextensive with one dimension of said sheet, resilient attaching means interposed between adjacent edges of the sheets to permit relative movement thereof, stringers interposed between said sheets and the aircraft component to support and space the supplemental skin from the skin of said component whereby all aerodynamic loads imposed on said sheets transfer through the stringers to the internal frame of the component, attaching means operative between the several sheets and said stringers for the interconnection thereof, and insulation means interposed between said supplemental skin and said component to deter the passage of heat to the component.

5. The combination with an aircraft component including an internal frame surrounded and enclosed by a main skin, of a supplemental skin assembly formed to surround and enclose said component and rest substantially parallel to said main skin, stringers fixedly secured to and projecting from the main skin to engage and support the supplemental skin assembly spaced from the component and thereby transfer all loads imposed on the supplemental skin to the frame of the component, and connection means operative between the supplemental skin assembly and the stringers for limited relative movement therebetween.

6. The combination with an aircraft component including an internal frame and a surrounding main skin, of a supplemental skin formed to surround and enclose the component, said skin being longitudinally corrugated, stringers interposed between the supplemental skin and the component to support said skin spaced therefrom, attaching means positioned within the corrugations of the supplemental skin to secure it to and for limited movement relative to said stringers, and insulating lagging disposed adjacent the inner face of the supplemental skin and extending between such skin and the stringers, said lagging being separated from the main skin of the component by an air gap.

7. The combination with an aircraft component including an internal frame enclosed and surrounded by a skin, of a composite supplemental skin consisting of several sheets fabricated of high heat-resistant metal and formed to surround and enclose said component, means securing said sheets together for relative movement, stringers interposed between the supplemental skin and the skin of the component, means for securing the supplemental skin to the stringers for limited movement relative thereto, the aerodynamic loads imposed on the supplemental skins being transferred through said stringers to the frame of the component, and a heat-insulating blanket spaced from the skin of the component and disposed against the inner face of the supplemental skin and extending between such skin and the stringers to retard heat transfer from the supplemental skin to the component.

8. The combination with an aircraft component including an internal frame and a skin enclosing said frame, of a secondary skin surrounding and spaced from the component consisting of multiple sheets of metal having higher heat-resistant characteristics than the skin and frame of the component disposed in overlapping relation one to the other and forming a continuous outer skin, resilient connections between the several sheets to permit relative movement thereof, stringers disposed between the outer skin and the component and fixedly secured to the latter, bolts of metal having substantially the same heat-resistant characteristics as the sheets piercing the outer skin and passing through oversized openings in the underlying stringers whereby said bolts are capable of limited movement with the outer skin relative to the stringers, floating anchor nuts secured to the stringers in alignment and for attaching cooperation with the bolts, and an insulating blanket disposed within the space between the outer skin and said stringers.

9. The combination with a conventional aircraft component including an internal frame and enclosing skin of metal having relatively low heat-resisting characteristics, of a supplemental skin assembly to be removably and replaceably mounted on, to surround and enclose, said component comprising a plurality of corrugated sheets fabricated of metal having relatively high heat-resisting characteristics, said sheets being disposed in overlapping relation one to another with the corrugations thereof coextensive in length with the component, stringers of metal having substantially the same heat-resisting characteristics as the metal of the component fixedly secured to the component and projecting outwardly therefrom to engage and dispose the supplemental skin in spaced relation to the skin of the component, expansion joints connecting the several sheets one to another to permit relative movement thereof, and bolts of the same metal as said sheets piercing the supplemental skin and secured to the underlying stringers, said bolts being movable with the supplemental skin relative to said stringers.

10. The combination with an aircraft component including an internal frame and an enclosing skin both fabricated of aluminum alloy, of a supplemental skin comprising a series of sheets of material having thermal characteristics substantially equivalent to stainless steel formed to enclose said component and organized for limited relative movement, stringers fabricated of aluminum alloy with outstanding flanges at opposed edges thereof, one flange of each stringer resting flush on the skin of the component and fixedly secured to the frame thereof and the opposite flange being slotted and disposed adjacent the supplemental skin, bolts of substantially the same material as said sheets piercing the supplemental skin in alignment with said slots, a floating anchor nut secured to the slotted flange of each stringer in registration with each slot therein for cooperation with one of said bolts, and heat-insulating means interposed between the supplemental skin including said bolts and the stringers.

11. The combination with a conventional aircraft component consisting of an internal frame and enclosing skin both fabricated of metal capable of withstanding heat of the order of at least 250° F., of a series of stringers having substantially the same heat-resisting properties as the component, each stringer having outstanding flanges at its edges, one flange being fixedly secured to the frame of the component and resting flush on the skin thereof and the other flange having spaced slots therein, a supplemental skin fabricated of metal capable of withstanding heat of the order of at least 900° F. formed to surround and enclose the component outwardly of said stringers, said supplemental skin having openings therein in registration with the slots in the several stringers, screw bolts seated in each of said openings and projecting through said slots, and a floating anchor nut attached to the undersurface of the slotted flange of each stringer in registration with each slot therein for cooperation with the bolt projecting through such slot.

12. The combination with a conventional aircraft component consisting of an internal frame and enclosing skin both fabricated of metal capable of withstanding heat of the order of at least 250° F., of a series of stringers having substantially the same heat-resisting properties as the component, each stringer having outstanding flanges at its edges, one flange being fixedly secured to the frame of the component and resting flush on the skin thereof and the other flange having spaced slots therein, a strip of heat-insulating material mounted on and coextensive with the slotted flange of each stringer, said strip being provided with openings therein registering with the slots in the underlying stringer, a heat-insulating blanket disposed over and between said strip having openings in alignment with the slots in the stringers, a supplemental skin fabricated of metal capable of withstanding heat of at least 900° F. formed to enclose and surround the component outwardly of said blanket and having apertures therein for registration with said slots and the openings in the strips and blanket aligned with said slots, a screw bolt seated in each group of registered apertures and openings to project through the aligned slot, and a floating anchor nut secured to the under surface of the slotted flange of each stringer in alignment with each slot therein for engagement of the screw bolt projecting through such slot.

13. The combination with an aircraft component having an internal frame structure enclosed by a skin, of an aerodynamically clean secondary skin assembly spaced from and surrounding and enclosing said component, means for mounting said secondary assembly on said component to transfer all aerodynamic loads and pressures acting on the secondary skin through said mounting means to the frame structure of the component, and a fabric of insulating material disposed adjacent the inner surface of the secondary skin in spaced relation to the skin of the component to prevent the passage of heat generated in the secondary skin into the component.

14. The combination with an aircraft component having an internal frame and a skin enclosing said frame, both frame and skin being fabricated of metal capable of withstanding heat of at least 250° F., of a series of spaced stringers disposed on the skin and fixedly secured to the internal frame of the component, a relatively thick heat-insulating strip positioned on and coextensive with each stringer, a heat-insulating blanket enclosing the component and the stringers attached thereto, a corrugated supplemental skin fabricated of metal capable of withstanding heat of at least 900° F., the depressions between the corrugations of such supplemental skin being located over and in approximate alignment with said insulating strips, and attaching means piercing the depressions between the corrugations of the supplemental skin, said insulating strips and stringers to secure the supplemental skin to the stringers and through them to the internal frame of the component.

15. The combination with an aircraft component consisting of an internal frame and skin enclosing and attached to said frame, both the frame and skin being fabricated of metal capable of withstanding heat of at least 250° F., of a series of spaced stringers disposed on the skin of the component and fabricated of metal having approximately the same heat-resistant properties as the metal of the component, each stringer consisting of a web disposed substantially normal to the skin of the component and having flanges at each edge of the web extending in opposite directions from the web, one of said flanges resting flush on the skin of the component and fixedly secured to the internal frame thereof, a strip of heat-insulating material coextensive and in flush contact with the flange of each stringer remote from the component, a heat-insulating blanket disposed over the insulating strips to encircle the entire assembly, a corrugated supplemental skin fabricated of metal capable of withstanding heat of at least 900° F. positioned over the blanket with the depressions between corrugations located over the insulating strips and underlying flanges of the stringers, and means for securing the depressions between corrugations of the supplemental skin through the blanket and insulating strips to the flanges of the stringers remote from the component.

16. The combination with an aircraft component consisting of an internal frame and skin enclosing and attached to said frame, both the frame and skin being fabricated of metal capable of withstanding heat of at least 250° F., of a series of spaced stringers disposed on the skin of the component and fabricated of metal having approximately the same heat-resistant properties as the metal of the component, each stringer consisting of a web disposed substantially normal to the skin of the component and having flanges at each edge of the web extending in opposite directions from the web, one of said flanges resting flush on the skin of the component and fixedly secured to the internal frame thereof, a strip of heat-insulating material coextensive and in flush contact with the flange of each stringer remote from the component, a heat-insulating blanket disposed over the insulating strips to encircle the entire assembly, a corrugated supplemental skin fabricated of metal capable of withstanding heat of at least 900° F. positioned over the blanket with the depressions between corrugations located over the insulating strips and underlying flanges of the stringers, and means having approximately the same heat-resistant properties as the supplemental skin for attaching said skin at the depressions between corrugations to the underlying flanges of the stringers, said means being organized and arranged for movement with supplemental skin relative to the stringers to compensate for the contraction and expansion of the supplemental skin under heat generated by flight.

References Cited in the file of this patent

UNITED STATES PATENTS

| | | |
|---|---|---|
| 1,851,194 | Ledwinka | Mar. 29, 1932 |
| 1,851,211 | Ragsdale | Mar. 29, 1932 |
| 2,310,765 | Dornier | Feb. 9, 1943 |

FOREIGN PATENTS

| | | |
|---|---|---|
| 859 179 | France | Mar. 27, 1940 |